United States Patent [19]

Solleder et al.

[11] Patent Number: 5,080,335
[45] Date of Patent: Jan. 14, 1992

[54] SUPPORTING BEARING

[75] Inventors: Otto Solleder, Leutenbach; Helmut Flemming, Hochdorf; Einhard Kleinschmit, Esslingen, all of Fed. Rep. of Germany

[73] Assignee: Daimler-Benz AG, Fed. Rep. of Germany

[21] Appl. No.: 539,360

[22] Filed: Jun. 18, 1990

[30] Foreign Application Priority Data

Jun. 16, 1989 [DE] Fed. Rep. of Germany ....... 3919775

[51] Int. Cl.$^5$ .............................................. F16F 1/36
[52] U.S. Cl. .............................. 267/141.4; 267/141.1; 267/153
[58] Field of Search ...................... 267/293, 294, 140.1, 267/141.1, 141, 141.2, 141.3, 141.4, 141.5, 141.6, 141.7; 248/557, 560, 634, 635

[56] References Cited

U.S. PATENT DOCUMENTS

| 2,147,660 | 5/1936 | Loewus | 248/613 |
| 2,830,780 | 4/1958 | Schloss | 267/141.4 |
| 2,926,881 | 3/1960 | Painter | 267/141.4 |
| 3,086,765 | 4/1963 | Zanow | 267/141.1 |
| 3,552,785 | 1/1971 | Elder et al | 403/197 |
| 3,679,158 | 7/1972 | Pusch | 267/153 X |
| 4,213,718 | 7/1980 | Lumby | 257/141.3 X |
| 4,286,777 | 4/1981 | Brown | 248/635 X |

FOREIGN PATENT DOCUMENTS

| 776990 | 6/1957 | European Pat. Off. . |
| 1274734 | 5/1972 | European Pat. Off. . |
| 0058911 | 9/1982 | European Pat. Off. . |
| 2122358 | 11/1972 | Fed. Rep. of Germany . |
| 608671 | 9/1960 | Italy ................. 267/141.4 |

Primary Examiner—Matthew C. Graham
Attorney, Agent, or Firm—Evenson, Wands, Edwards, Lenahan & McKeown

[57] ABSTRACT

A supporting bearing for resiliently supporting parts to be connected to one another, such as the body and rear axle housing of a motor vehicle, includes two bearing parts to be arranged on mutually opposite bearing surfaces of one part, coaxially to a bore traversing the latter. These bearing parts are each equipped with an annular elastomer element arranged between two supporting parts and can be clamped to the part in which the bore has been made using a clamping bolt traversing the bearing parts and the bore with radial clearance. The elastomer elements of the two bearing parts are, on the one hand, vulcanized to one of the supporting parts accommodating them between them and, on the other hand, rest on the other supporting part by an integrally formed surface region projecting at their free front face.

7 Claims, 1 Drawing Sheet

FIG. 1 PRIOR ART
FIG. 2 PRIOR ART
FIG. 3
FIG. 4
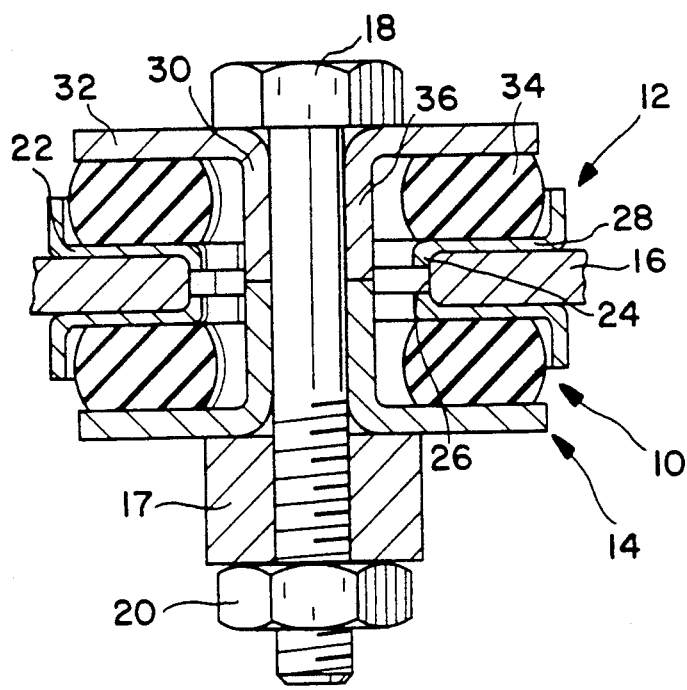
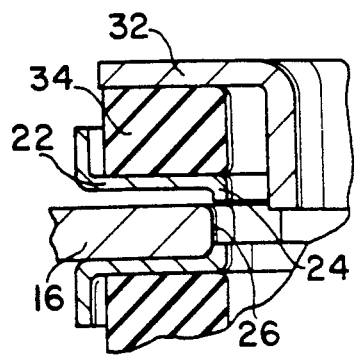
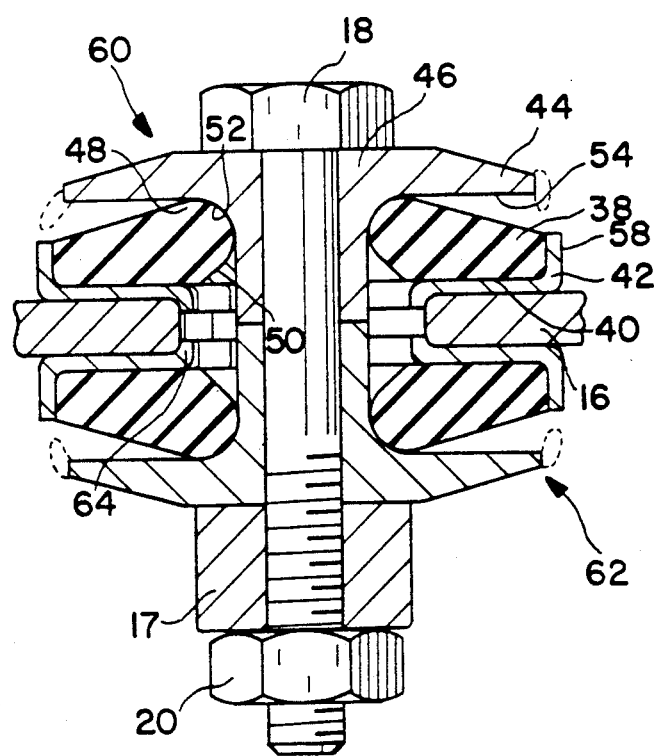
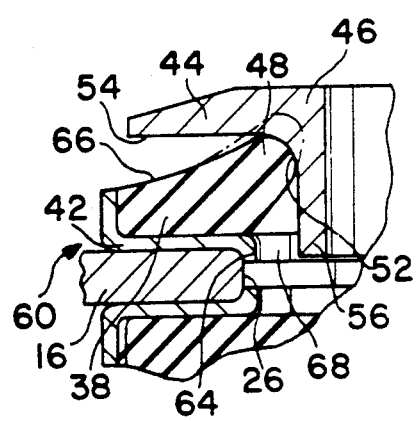

SUPPORTING BEARING

BACKGROUND AND SUMMARY OF THE INVENTION

The invention relates to a supporting bearing for resiliently supporting parts to be connected to one another, such as the body or rear axle support and rear axle gear unit of a motor vehicle.

A supporting bearing of this type is known in which the supporting parts of the two bearing parts which rest against mutually opposite bearing surfaces of a crossmember of a vehicle body in order to support a rear axle gear unit, said bearing parts accommodating the crossmember between them, are of cup-like design. The clamping bolt, which also passes through the crossmember, being passed through the base of the bearing parts.

With the aid of the clamping bolt, the rear axle gear unit is supported in a resiliently complaint manner on the crossmember in the axial direction of the bolt via the two bearing parts.

In this arrangement, the annular elastomer element of each bearing part is vulcanized by flat front faces both to the base of the cup-like supporting part and to the flange of the pressure piece fitting over the latter, the pressure piece traversing with a neck with radial clearance the central opening of the elastomer element and the bore in the base of the associated supporting part and protruding into the crossmember bore. The annular elastomer element likewise has a radial clearance with respect to the wall of the vulcanized-on supporting part.

The fabrication of this supporting bearing is complicated since supporting part and pressure piece are to be jointly vulcanized to the elastomer element, this being possible only with the aid of a correspondingly expensive vulcanizing mould.

It is furthermore disadvantageous that the elastomer element must be highly prestressed in order to avoid one of its two bearing parts being able to lift off from its bearing surface of the part supporting the supporting bearing in the event of compressive loading of the supporting bearing. However, this cannot be avoided in the case of very high supporting forces because in this case, due to its connection to the flange of the associated pressure piece, established via the elastomer element, the cup-shaped supporting part of the relieved bearing part is lifted off, for example, from the crossmember, this causing troublesome knocks. It is also easily possible, if extreme supporting forces occur, that the collar of the supporting part will jump out of the crossmember bore, and this can lead to the collar tilting in the bore when this bearing part is loaded and the supporting part thereby being damaged or the entire bearing part no longer being able to return to its intended design position.

The necessity of highly prestressing the supporting bearing is here to the detriment of bearing softness and at the expense of the desire acoustic decoupling, which can in any case only be achieved to an unsatisfactory degree due to the relatively large contact areas between the elastomer elements and the supporting parts and pressure pieces associated with them.

The necessary axial prestressing of the elastomer elements, correspondingly hardening the supporting bearing and leading to a correspondingly steep characteristic, also lead to its inner and outer circumferential surfaces arching outwards. As a result, stress peaks occur in the elastomer material at the edge regions of the vulcanization faces, prejudicing their strength and ability to withstand sustained loading.

Finally, the bonding of the elastomer elements at both front faces by vulcanization has the consequence that the supporting bearing is only unsatisfactorily fixed in the radial direction.

An object on which the invention is based is to improve supporting bearings of the above-noted type in such a way that, in addition to a considerable simplification of their fabrication, a longer spring excursion, improving acoustic decoupling, is achieved and damaging overloading of the elastomer elements due to stress and a lifting off of the bearing part relieved during the occurrence of high supporting forces from its supporting surface are effectively prevented.

These objects are achieved according to preferred embodiments of the invention by providing an arrangement wherein a clamping bolt is provided for clamping the two bearing parts together, said clamping bolt simultaneously receiving one of the parts to be connected and traversing the bore of the other part to be connected with radial clearance so as to mutually clamp the parts to be supported resiliently relative to one another, wherein a free front face of the elastomer element has a part-region which projects towards the front face facing it of one of the supporting part and the pressure piece to which it is not vulcanized and rests against said front face.

With this bearing construction according to the invention, the elastomer elements of the two bearing parts are thus in each case now only vulcanized by one of their front faces to the supporting part or pressure piece. These parts are therefore separated from one another and, during bearing assembly, have only to be fitted together. This separate association offers the further advantage that, in the case of very powerful jolts, the pressure piece of the bearing part experiencing relief during this process can, if its elastomer element is vulcanized to the supporting part, lift off from the elastomer element and the supporting part can thus remain on its bearing surface. A similar result is obtained if the elastomer element is vulcanized to the pressure piece. In this case, it is lifted off from the supporting part by the pressure piece.

In the intended design position, the area of contact between the elastomer elements and the supporting part or pressure piece resting against the latter is here at a minimum, this guaranteeing optimum soundproofing; not least due to the possibility of designing the bearing surface of supporting part or pressure piece in such a way that the spring excursion is long and the prestressing force correspondingly small. This offers the particular advantage that, as the compressive loading of the supporting bearing increases, the spring progression over the spring excursion is initially gradual until, from a certain spring excursion, the supporting bearing is highly stiffened by correspondingly rising progression. This pronounced spring stiffness can replace a stop limiting the spring excursion, with the advantage that it does not reach its maximum value abruptly, rather it reaches it continuously but rapidly and noise generation is thereby prevented. This progression of the spring characteristic arises from the increasingly larger bearing surface during axial loading of the bearing, under compressive stress the supporting part or pressure piece rolling against the elastomer element, its free front face portion gradually decreasing as a result. This relative movement of the surfaces resting against one another due to corresponding extension of the elastomer element produces friction and hence simultaneously vibration damping.

Furthermore, the arrangement of the invention also result in greater radial hardness of the supporting bearing, producing, under the influence of inertial forces, a better fixing of the supporting bearing.

In addition to the above-mentioned construction, from which the invention starts, a supporting bearing in accordance with German Published Unexamined Patent Application (DE-OS) 3,106,690 is already known, the construction of the two bearing parts of which is similar to that of the supporting bearing according to the invention. Their annular elastomer elements are, however, of conical design, having, due to their larger diameter, radially projecting part-regions which rest in bearing recesses formed in the beam.

Further, German Published Examined Patent Application (DE-AS) 1,163,165, in FIG. 6, discloses a supporting bearing which has two annular rubber spring elements which are supported opposite to one another against an intermediate piece and are of conical design at their front faces. The front faces which face away from each other taper conically inwards, these front faces thus each having an axially projecting outer part-region which rests against a counter-surface. However, here the intermediate piece does not form one of two parts to be supported resiliently relative to one another.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic longitudinal sectional view through a known, supporting bearing;

FIG. 2 shows a detail of the upper bearing part according to FIG. 1, in the relieved condition;

FIG. 3 is a schematic longitudinal sectional view through a supporting bearing designed according to a preferred embodiment of the invention;

FIG. 4 shows a longitudinal section of the upper bearing part according to FIG. 3, in the relieved condition.

DETAILED DESCRIPTION OF THE DRAWINGS

According to FIG. 1, the known construction of a supporting bearing 10 of the generic type has an upper and a lower bearing part 12 and 14 which are fixed on opposite sides of a beam, for example a transverse tie-bar 16 fixed to the body of a passenger vehicle, for supporting a rear axle gear unit provided underneath the transverse tie-bar 16. The only part of the rear axle gear unit which is shown is a mounting lug 17, which is traversed by the shank of a clamping bolt 18 of the supporting bearing 10. The clamping bolt 18 extends through the transverse tie-bar 16 and also through the two bearing parts 12 and 14.

Screwed onto the clamping bolt 18 is a clamp nut 20, which is supported against the mounting lug 17 and clamps the mounting lug 17 to the supporting bearing 10 and the supporting bearing 10 to the transverse tie-bar 16. The two bearing parts 12 and 14 are of symmetrical construction. Bearing parts 12 and 14 each have a cup-shaped supporting part 22 which engages by a collar 24, formed integrally at the center, in a bore 26 traversing the transverse tie-bar 16 and rests with its base 28 against the transverse tie-bar 16.

Assigned coaxially to this cup-shaped supporting part 22 is a pressure piece 30 which fits over the supporting part 22 with a flange 32. Arranged between the base 28 of the supporting part 22 and the flange 32 of the pressure piece 30 is an annular elastomer element 34, preferably consisting of rubber, which is vulcanized with its front faces both to the base 28 and to the flange 32. The pressure piece 30 has a neck 36 which is traversed by the shank of the clamping bolt 18 and the outside diameter of which neck 36 is smaller than the inside diameter of elastomer element 34 and bore 26 or collar 24.

In the installed condition of the supporting bearing 10, the necks 36 of the pressure pieces 30 rest against one another by their front faces, the two elastomer elements 34 thereby receiving a defined prestress. This prestress is to be chosen so that, even in the case of large axial supporting forces, the cup-like supporting parts 22 of the bearing parts 12 and 14, which then become relieved, cannot be lifted off from the bearing surface of the transverse tie-bar 16. However, this leads to a bearing hardness which correspondingly reduces the desired acoustic decoupling.

Despite the given prestress of the elastomer element 34, it is not possible in the case of extremely strong supporting forces, when the pressure piece 30 of, for example, the upper bearing part 12 is lifted off, to prevent the cup-shaped supporting part 22 from also being lifted off from its bearing surface of the transverse tie-bar 16 by the elastomer element 34 vulcanized to the flange 32 and to the supporting part 22, and its collar 24 from being possibly pulled out of the transverse tie-bar bore 26, as can be seen from FIG. 2. There is then the possibility, particularly in the case of a simultaneous radial loading of the supporting bearing, that the collar 24 will tilt on the transverse tie-bar 16 and as a result will no longer be able to return into its intended design position. However, in all cases, troublesome noises in the form of knocks occur in the event of such axial displacements of the supporting part 22. In addition, during such axial displacements the elastomer element 34 of the stressed bearing part 12 or 14 is highly compressed, with the result that the elastomer material at the outer and inner circumference arches outwards, damaging stress peaks occurring at the edges of the vulcanization faces.

In the supporting bearing according t the invention, in accordance with FIG. 3, the elastomer element 38, which preferably likewise consists of rubber, is only vulcanized to the base 40 of the cup-shaped supporting part 42. The flange 44 of the pressure piece 46, on the other hand, rests on the elastomer element 38. The flange 44 rests against elastomer element 38 only at a projecting part-region 48 at a front face facing the flange 44. This projecting part-region 48 is integrally formed in the manner of a torus in the transitional region of the front face 49 facing the pressure piece 46 and of the inner circumferential surface 50 of the elastomer element 38 and rests against a mating surface portion 52 of the pressure piece 46 of concave crosssection. The portion 52 is situated in the transitional region between the inner front face 54 and the neck 56 integrally formed on the flange 44. The elastomer element 38 is also vulcanized to the inner circumference of a collar 58 of the supporting part 42. A similar collar is shown in phantom on the pressure piece according to another embodiment. The advantage is thereby obtained that dirt and water cannot be deposited between the supporting part 42 and the elastomer element 38, which could lead to corrosion on the supporting part 42. In addition, damage to the elastomer element 38 cannot be ruled out under the action of dirt. The outside diameter of the necks 56 of the pressure pieces 46 of both bearing parts 60 and 62 is slightly greater than the inside diameter of the toroidal part-region 48 of the associated elastomer element 38, with the result that, when the supporting bearing is installed in the corresponding elastomer element 38, the pressure pieces 46 are radially fixed.

Similarly to the known bearing construction, the outside diameter of the neck 56 is considerably smaller than the inside diameter of the crossmember bore 26 and the collar 64 of the supporting parts 42 engaging in the latter.

As FIG. 4 shows, the pressure piece 46, which is displaced, for example upwards, in the event of extreme axial forces, can be displaced independently of the elastomer element 38 and, given appropriate dimensioning of the projection of part-region 48 of the elastomer element 38, may also lift off from the elastomer element 38. The position of the supporting part 42 concerned remains unaffected by this axial movement. Troublesome noise generation is thus excluded in the case of such axial loads.

However, the bearing construction offers the considerable advantage that, given appropriate bearing design, lifting off can be reliably prevented by an appropriate choice of prestressing path. This means identical spring characteristics during compression and rebound, given the same configuration of the two bearing parts 60 and 62, the progression of one bearing part thus theoretically preventing lifting off of the elastomer element 38 of the relieved bearing part, with the result that a stop can be dispensed with.

In the case of two bearing parts 60 and 62 of different configuration, on the other hand, the progression of the harder bearing part has already started at a point in time at which the spring excursion of the other bearing part has not yet been produced, with the result that lifting off of the pressure piece 46 of the relieved bearing part is not possible.

As indicated by chain lines in FIG. 4, the axial extension of the toroidal part-region 48 is dimensioned in such a way that the elastomer element 38 is always guaranteed to rest against the associated pressure piece 46 even in the case of the maximum possible lifting path of the bearing parts 60 or 62.

Under compressive loading of the elastomer element 38, the flange 44 of the corresponding pressure piece 46 rolls against the elastomer element 38, the free front face part 49' gradually decreasing. The elastomer element 38 simultaneously arches radially inwards and downwards at the inner circumferential region into the annular space 68 present between the collar 64 and the neck 56. Initially, the deformation of the elastomer element 38 which thus takes place produces a gently rising characteristic of the supporting bearing or of its two bearing parts 60 or 62 and, with increasing reduction of the free surface area of the loaded bearing part 60 or 62, produces a highly progressive characteristic. The rolling of the front face 54 of the flange against the front face part 49' of the elastomer element 38 also causes friction at the outer circumference of the neck 56, this simultaneously having a vibration-damping effect.

The toroidal part-region 48 of the elastomer element 38 can also be provided in a different radial region according to other contemplated embodiments. Embodiments are also contemplated with varying of the shape of the spring characteristic in accordance with the intended applications of the supporting bearing by appropriate positioning of the inner front face 54 relative to the elastomer element 34.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Supporting bearing for resiliently supporting motor vehicle parts to be connected to one another, comprising
    first and second bearing parts arranged on mutually opposite faces of one of said motor vehicle parts, coaxially to a bore traversing the one motor vehicle part, said first and second bearing parts each including:
    a cup-shaped supporting part, having a front face and a collar, which engages the bore and rests against the one motor vehicle part,
    a pressure piece, having a front face, arranged coaxially with said cup-shaped supporting part and having a flange integrally formed on a neck fitting over the cup-shaped supporting part,
    an annular elastomer element, having front faces, is arranged between the cup-shaped supporting part and the pressure piece, said annular elastomer element having one of said front faces vulcanized to the front face of one of said cup-shaped supporting part and said pressure piece which mutually face each other, said neck of the pressure piece being in engagement with said annular elastomer element,
    a clamping bolt provided for clamping the first and second bearing parts together, said clamping bolt simultaneously receiving another of the motor vehicle parts to be connected and traversing the bore of the one motor vehicle part to be connected with radial clearance so as to mutually clamp the motor vehicle parts resiliently relative to one another,
    wherein another front face of the annular elastomer element is free and has a part-region projecting towards and resting against the front face of one of the supporting part and the pressure piece to which it is not vulcanized;
    wherein the elastomer element has a transitional region from the front face to an inner circumferential surface, said projecting part region being integrally formed in a toroidal shape in said transitional region and resting against a concave cross-section mating surface portion of said one of the supporting part and the pressure piece to which it is not vulcanized.

2. Supporting bearing according to claim 1, wherein the full height of the projecting part-region of the elastomer element corresponds at least to a maximum lifting path of the associated bearing part.

3. Supporting bearing according to claim 2, wherein the one of the supporting part and pressure piece supporting the elastomer element and connected thereto by vulcanizing has a collar to which the elastomer element is vulcanized.

4. Supporting bearing according to claim 2, wherein a neck integrally formed on the pressure piece traverses the elastomer element and engages in the bore of the part to be connected accommodated between two bearing parts, the outside diameter of the neck being larger than the inside diameter of the elastomer element but smaller than the inside diameter of the collar integrally formed on the supporting part.

5. Supporting bearing according to claim 1, wherein the one of the supporting part and pressure piece supporting the elastomer element and connected thereto by vulcanizing has a collar to which the elastomer element is vulcanized.

6. Supporting bearing according to claim 5, wherein a neck integrally formed on the pressure piece traverses the elastomer element and engages in the bore of the part to be connected accommodated between two bearing parts, the outside diameter of the neck being larger than the inside diameter of the elastomer element but smaller than the inside diameter of the collar integrally formed on the supporting part.

7. Supporting bearing according to claim 1, wherein a neck integrally formed on the pressure piece traverses the elastomer element and engages in the bore of the part to be connected accommodated between two bearing parts, the outside diameter of the neck being larger than the inside diameter of the elastomer element but smaller than the inside diameter of the collar integrally formed on the support part.

* * * * *